US008268159B2

(12) United States Patent
Balagopal et al.

(10) Patent No.: US 8,268,159 B2
(45) Date of Patent: Sep. 18, 2012

(54) ELECTROLYTIC PROCESS TO PRODUCE SODIUM HYPOCHLORITE USING SODIUM ION CONDUCTIVE CERAMIC MEMBRANES

(75) Inventors: Shekar Balagopal, Sandy, UT (US); Vinod Malhotra, Cedar City, UT (US); Justin Pendleton, Salt Lake City, UT (US); Kathy Jo Reid, Cedar City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1013 days.

(21) Appl. No.: 11/613,857

(22) Filed: Dec. 20, 2006

(65) Prior Publication Data
US 2007/0138020 A1 Jun. 21, 2007

Related U.S. Application Data

(60) Provisional application No. 60/753,191, filed on Dec. 20, 2005.

(51) Int. Cl.
*C25B 1/46* (2006.01)
*C25B 1/34* (2006.01)
*C25B 1/26* (2006.01)
*C25B 1/24* (2006.01)
*C25B 1/16* (2006.01)
*C25B 1/14* (2006.01)
*C25C 1/02* (2006.01)

(52) U.S. Cl. ........ 205/500; 205/508; 205/510; 205/473; 205/620; 205/621

(58) Field of Classification Search .................. 205/620, 205/621, 473, 508, 510, 500; 204/252, 263, 204/266
See application file for complete search history.

(56) References Cited

U.S. PATENT DOCUMENTS

| 2,636,852 | A | 4/1953 | Juda et al. |
| 3,197,392 | A | 7/1965 | Silversmith et al. |
| 3,730,857 | A | 5/1973 | Tripp |
| 3,925,174 | A | 12/1975 | Eng et al. |

(Continued)

FOREIGN PATENT DOCUMENTS
DE 19603181 4/1997
(Continued)

OTHER PUBLICATIONS

Phasge, Arun "Final Office Action for U.S. Appl. No. 11/449,953", (Nov. 17, 2009).
(Continued)

*Primary Examiner* — Bruce Bell
(74) *Attorney, Agent, or Firm* — David Fonda

(57) ABSTRACT

An electrochemical process for the production of sodium hypochlorite is disclosed. The process may potentially be used to produce sodium hypochlorite from seawater or low purity un-softened or NaCl-based salt solutions. The process utilizes a sodium ion conductive ceramic membrane, such as membranes based on NASICON-type materials, in an electrolytic cell. In the process, water is reduced at a cathode to form hydroxyl ions and hydrogen gas. Chloride ions from a sodium chloride solution are oxidized in the anolyte compartment to produce chlorine gas which reacts with water to produce hypochlorous and hydrochloric acid. Sodium ions are transported from the anolyte compartment to the catholyte compartment across the sodium ion conductive ceramic membrane. Sodium hydroxide is transported from the catholyte compartment to the anolyte compartment to produce sodium hypochlorite within the anolyte compartment.

41 Claims, 8 Drawing Sheets

U.S. PATENT DOCUMENTS

| | | | |
|---|---|---|---|
| 3,964,983 | A | 6/1976 | Eisenbach et al. |
| 4,217,184 | A | 8/1980 | Kuck et al. |
| 4,250,000 | A | 2/1981 | Kuck et al. |
| 4,857,665 | A | 8/1989 | Hinrichs et al. |
| 4,990,413 | A | 2/1991 | Lee et al. |
| 5,246,551 | A | 9/1993 | Pletcher et al. |
| 5,286,354 | A | 2/1994 | Bard et al. |
| 5,290,404 | A | 3/1994 | Toomey |
| 5,290,405 | A | 3/1994 | Joshi et al. |
| 5,362,368 | A * | 11/1994 | Lynn et al. ............ 205/335 |
| 5,389,211 | A | 2/1995 | Sharifian et al. |
| 5,425,856 | A | 6/1995 | Buckholtz et al. |
| 5,575,901 | A | 11/1996 | Hulme et al. |
| 5,578,189 | A | 11/1996 | Joshi |
| 5,580,430 | A | 12/1996 | Balagopal et al. |
| 5,935,393 | A | 8/1999 | Shinomiya et al. |
| 5,968,326 | A | 10/1999 | Yelon et al. |
| 5,985,388 | A | 11/1999 | Tomita et al. |
| 6,004,445 | A | 12/1999 | Genders et al. |
| 6,174,419 | B1 | 1/2001 | Osamu |
| 6,190,407 | B1 | 2/2001 | Ogle et al. |
| 6,221,225 | B1 | 4/2001 | Mani |
| 6,282,444 | B1 | 8/2001 | Kroll et al. |
| 6,333,093 | B1 | 12/2001 | Burrell et al. |
| 6,398,938 | B2 | 6/2002 | Merk et al. |
| 6,482,309 | B1 | 11/2002 | Green et al. |
| 6,573,205 | B1 | 6/2003 | Myers et al. |
| 6,591,133 | B1 | 7/2003 | Joshi |
| 6,703,153 | B1 | 3/2004 | Cubukcu et al. |
| 6,719,891 | B2 * | 4/2004 | Ruhr et al. ............ 205/500 |
| 6,770,187 | B1 | 8/2004 | Putter et al. |
| 6,805,787 | B2 * | 10/2004 | Bess et al. ............ 205/500 |
| 2003/0098244 | A1 | 5/2003 | Ruhr et al. |
| 2003/0106805 | A1 | 6/2003 | Horn |
| 2004/0267190 | A1 | 12/2004 | Tamarkin et al. |
| 2005/0177008 | A1 * | 8/2005 | Balagopal et al. ............ 568/851 |
| 2005/0204612 | A1 | 9/2005 | Connemann et al. |
| 2005/0262760 | A1 | 12/2005 | Lawson et al. |
| 2006/0169594 | A1 | 8/2006 | Balagopal et al. |
| 2006/0226022 | A1 | 10/2006 | Balagopal et al. |
| 2007/0012570 | A1 | 1/2007 | Carus et al. |
| 2007/0138020 | A1 | 6/2007 | Balagopal et al. |
| 2007/0141434 | A1 | 6/2007 | Joshi et al. |
| 2007/0158205 | A1 | 7/2007 | Balagopal et al. |
| 2008/0142373 | A1 | 6/2008 | Joshi et al. |
| 2008/0173540 | A1 | 7/2008 | Joshi et al. |
| 2008/0173551 | A1 | 7/2008 | Joshi et al. |
| 2008/0245671 | A1 | 10/2008 | Balagopal et al. |

FOREIGN PATENT DOCUMENTS

| | | |
|---|---|---|
| DE | 10360758 | 7/2005 |
| EP | 0146771 | 7/1985 |
| EP | 0559400 | 9/1993 |
| EP | 0826794 | 3/1998 |
| GB | 1155927 | 6/1969 |
| WO | WO-9627697 | 9/1996 |
| WO | WO-03014272 | 2/2003 |

OTHER PUBLICATIONS

Phasge, Arun "Final Office Action for U.S Appl. No. 11/396,057", (Jul. 23, 2009).
Phasge, Arun "Non-Final Office Action for U.S Appl. No. 11/396,057", (Dec. 24, 2009).
Phasge, Arun "Final Office Action for U.S. Appl. No. 11/010,822", (Jul. 10, 2009).
Phasge, Arun "Non-Final Office Action for U.S. Appl. No. 11/010,822", (Dec. 28, 2009).
Gregg, Nicholas "European Search Report", *European Application No. 06847897.3*, PCT App. No. PCT/US2006048746, (Sep. 16, 2009), 1-4.
Young, Lee W., "International Search Report", (Jul. 7, 2008),1-2.
Young, Lee W., "Written Opinion of the International Searching Authority", (Jul. 7, 2008),1-5.
Young, Lee W., "International Search Report", (Dec. 18, 2008),1-2.
Young, Lee W., "Written Opinion of the International Searching Authority", (Dec. 18, 2008),1-5.
Young, Lee W., "International Search Report", (Apr. 24, 2009),1-3.
Young, Lee W., "Written Opinion of the International Searching Authority", (Apr. 24, 2009),1-5.
Phasge, Arun S., "Office Action for U.S. App. No. 11/449,953", (Apr. 7, 2009),1-9.
Phasge, Arun S., "Office Action for U.S. App. No. 11/396,057", (Oct. 10, 2008),1-8.
Hinrichs, et al., "Abstract of DE3702052", *Patent Answer 14 of 19 in enclosed search by Science IP*, (Jul. 14, 1988), 11.
Young, "International Search Report for PCT/US07/00968 sent Oct. 1, 2007", 1-2.
Young, "Written Opinion for PCT/US07/00968 sent Oct. 1, 2007", 1-5.
Young, "International Search Report for PCT/US06/48746 sent Oct. 1, 2007", 1-2.
Young, "Written Opinion for PCT/US06/48746 sent Oct. 1, 2007", 1-4.
Phasge, Office Action for U.S. App. No. 11/010,822 sent Jun. 30, 2008, 1-6.
Young, "International Search Report for PCT/US07/25541 sent Mar. 17, 2008", 1-2.
Young, "Written Opinion for PCT/US07/25541 sent Mar. 17, 2008", 1-6.
Alamo, J. "Chemistry and properties of solids with the [NZP] skeleton", *Solid State Ionics*, vol. 63-65, (1993), 547-561.
Balagopal, S. et al., "Selective Sodium Removal From Aqueous Waste Streams with NaSICON Ceramics", *Separation and Purification Technology*, 15 (1999), 231-237.
Bentzen, J. J., et al., "The preparation and characterization of dense, highly conductive Na5GdSi4012 nasicon (NGS)", *Materials Research Bulletin*, vol. 15,(1980), 1737-1745.
Boilot, J.P. et al., "Stoichiometry-Structure-Fast Ion Conduction in the NaSICON Solid Solution", *Solid State Ionics*, 28-30 (1988), North-Holland, Amsterdam, 403-410.
Delmas, C. et al., "Crystal chemistry of the Na1+xZr2-xLx(PO4)3 (L = Cr, in, Yb) solid solutions", *Materials Research Bulletin*, vol. 16, (1981), 285-290.
Fujitsu, S. et al., "Conduction paths in sintered ionic conductive material Na1+xYxZr2-x(PO4)3", *Materials Research Bulletin*, vol. 16, (1981), 1299-1309.
Goodenough, J.B. et al., "Fast Na+ -Ion Transport in Skeleton Structures", *Mat. Res. Bull.*, vol. 11, 1976. Pergamon Press, Inc., 203-220.
Hong, H.Y-P. et al., "Crystal Structures and Crystal Chemistry in the System Na1+xZr2SixP3-x012", *Mat. Res. Bull.*, vol. 11, 1976. Pergamon Press, Inc. Printed in the United States., 173-186.
Miyajima, Y. et al., "Ionic conductivity of Nasicon-type Na1+xMxZr2-xP3012(M: Yb, Er, Dy)", *Solid State Ionics*, vol. 84, (1996), 61-64.
Saito, Y. et al., "Ionic Conductivity of Nasicon-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58, (1992), 327-331.
Shannon, R.D. et al., "Ionic Conductivity in Na5YSi4012 Type Silicates", *Inorganic Chemistry*, vol. 17, No. 4 (1978), 958-964.
Shimazu, K. et al., "Electrical conductivity and Ti4+ ion substitution range in Nasicon system", *Solid State Ionics*, vol. 79, (1995), 106-110.
Sutija, Davor et al., "Ceramic Cleansers: Environmental Uses of Sodium Super-Ionic Conducting Ceramics", *The Electrochemical Society Interface*, Winter 1996, vol. 5, No. 4, 26-30.
Van Gerpen, J. et al., "Biodiesel Production Technology", *National Renewable Energy Laboratory, NREL/SR-510-36244*, 1-110.
Von Alpen, V. et al., "Compositional dependence of the electrochemical and structural parameters in the Nasicon system (Na1+xSixZr2P3-xO12)", *Solid State Ionics*, vol. 3/4, (1981), 215-128.
Desbois, V. International Search Report from PCT application PCT/US/2004/041587, (Dec. 21, 2005), 1-4.
Desbois, V. Written Opinion of the International Searching Authority from PCT application PCT/US/2004/041587, (Dec. 21, 2005), 1-9.
De Jonge, Janos et al., Abstract of HU37469, (Dec. 28, 1985), 1.
Hamann, Carl H., et al., Abstract and claims of DE19603181, (Apr. 17, 1997), 1-2.

Hamann, Carl H., et al., Corresponding abstract DE3346131 (EP0146771), (Jun. 27, 1985), 1.

Horn, Michael Abstract of DE10246375, (May 15, 2003), 1.

Kuhn, Amselm T., et al., Abstract of GB1155927, (Jun. 25, 1969), 1-2.

Lehmann, Thomas et al., Abstract of DE10360758, (Jul. 28, 2005), 1-2.

Oku, Toshio et al., Abstract of JP53011199, (Feb. 1, 1978), 1.

Rooney, K. Abstract and International Search Report for WO03014272, (Nov. 2, 2003) 1-6.

Satou, Hiroshi et al., Abstract of JP59067379, (Apr. 17, 1984), 1.

Cho, Tsurahide et al., Abstract of JP07196561, Patent answer 8 of 19 in enclosed search by Science IP, (Aug. 1, 1995), 8.

Radoi, Ion et al., Abstract of RO103535, Patent answer 10 of 19 in enclosed search by Science IP, (Jun. 15, 1993), 10-11.

Machlitt, Rainer et al., Abstract of DD139528, Patent answer 19 of 19 in enclosed search by Science IP, (Jan. 9, 1980), 14.

Strathmann, H. Abstract of "Bipolar membranes: their properties and applications", *Clean and Efficient Processing: Electrochemical Technology for Synthesis, Separations, Recycle, and Environmental Improvement, international Forum, electrolysis in the Chemical Industry, 12th. Clearwater Beach, Fla.,*, Oct. 11, 1998, 221-251. Non-patent answer 3 of 9 in enclosed search by Science IP, 15-16.

Koter, S. Abstract of "Electrosynthesis of methanolates by membrane electrolysis", *Polish Journal of Chemistry*, (1997), 71(2), 232-243. Non-patent answer 5 of 9 in enclosed search by Science IP, (1997), 16-17.

Sridhar, S. Abstract of "Electrodialysis in a non-aqueous medium: production of sodium methoxide", *Journal of Membrane Science*, 1996, 113(1), 73-79. Non-patent answer 6 of 9 in enclosed search by Science IP (1996), 17.

Hamann, et al., Abstract of "Transport and conversion processes in the direct electrochemical synthesis of alcoholates with Nafion membranes", *Chemie Ingenieur Technik*, (1992), 64 (7), 648-649. Non-patent answer 7 of 9 in enclosed search by Science IP (1992), 17.

Young, Lee "International Search Report", International Application No. PCT/US 08/08623, (Oct. 1, 2008), 1-2.

Young, Lee "Written Opinion of the International Search Authority", International Application No. PCT/US 08/08623, (Oct. 1, 2008), 1-5.

Jo, Soo "Written Opinion of the International Search Authority", International App. No. PCT/US2009/054953, (Mar. 31, 2010), 1-4.

Jo, Soo "International Search Report", International App. No. PCT/US2009/054953, (Mar. 31, 2010), 1-3.

Jo, Soo "Written Opinion of the International Search Authority", International App. No. PCT/US2009/054966, (Apr. 1, 2010), 1-4.

Jo, Soo "International Search Authority", International Application No. PCT/US2009/054966, (Apr. 1, 2010), 1-3.

Gamez, Agnes "Supplementary European Search Report", Search Report and Opinion for European Patent Application # EP08794491.4, (Sep. 16, 2011), 1-5.

Friday, Steven "Non-Final Office Action", Non-final Office Action for U.S. Appl. No. 12/547,334, pages, (Feb. 29, 2012), 1-11.

Kunigata, Yasunobu "Notice of reasons for rejection", Translation of Japanese office action for JP application # 2008/547536 (corresponding to U.S. Appl. No. 11/613,857), (Sep. 13, 2011), 1-4.

Kunigata, Yasunobu "Notice of reasons for rejection", Translation of Japanese office action for JP application # 2008/547536 (corresponding to U.S. Appl. No. 11/613,857), 1-4 dated Sep. 5, 2011.

Gamez, Agnes "Supplementary European Search Report", Search Report and Opinion for European Patent Application # EP08794491.4, 1-5.

Phasge, Arun "Non-Final Office Action", Non-final Office Action for U.S. Appl. No. 12/547,334, pp. 1-11, dated Feb. 29, 2012.

\* cited by examiner

ELECTROLYTIC PROCESS TO PRODUCE SODIUM HYPOCHLORITE USING SODIUM ION CONDUCTIVE CERAMIC MEMBRANES

CROSS-REFERENCE TO RELATED APPLICATION

This application claims the benefit of U.S. Provisional Patent Application No. 60/753,191, filed Dec. 20, 2005, which is incorporated by reference.

GOVERNMENT RIGHTS

This invention was made in part with government support under grant number DE-FG02-05ER84221 awarded by the United States Department of Energy. The Government has certain rights in the invention.

FIELD OF THE INVENTION

The present invention relates in general to electrochemical processes for the production of sodium hypochlorite (NaOCl). More particularly, the present invention provides an electrochemical process for producing sodium hypochlorite using a sodium ion conductive ceramic membrane.

BACKGROUND OF THE INVENTION

Sodium hypochlorite is a chemical compound having the general chemical formula NaOCl. Sodium hypochlorite is used in a wide variety of applications, including uses as a disinfectant and/or a bleaching agent. In one application, sodium hypochlorite is marketed as a 3-6 weight percent solution for use as household bleach. Stronger solutions are marketed for use in the chlorination of water at water treatment plants, as a disinfectant in medical applications, and even stronger solutions are produced for chlorination of swimming pools. Sodium hypochlorite has been used for the disinfection of drinking water, at a concentration equivalent to about 1 liter of household bleach per 4000 liters of water. The exact amount required depends on the water chemistry, temperature, contact time, and presence or absence of sediment.

In some methods, sodium hypochlorite is prepared by absorbing chlorine gas into cold sodium hydroxide solution to induce the following reaction:

$2NaOH + Cl_2 \leftrightarrows NaCl + NaOCl + H_2O$

The sodium hydroxide and chlorine reagents input into this process may be commercially produced by the chloralkali process. For use in this reaction, there is generally no need to isolate the reagents, thus, NaOCl may be prepared in an industrial setting by electrolyzing sodium chloride solution without any separation or barrier between the anode and the cathode. In this process, the reaction solution is generally maintained at a temperature below about 40° C. in order to prevent the formation of sodium chlorate. As a result, commercially-prepared sodium hypochlorite solutions generally contain amounts of sodium chloride as a primary byproduct.

Current methods for the production of sodium hypochlorite such as that described above are subject to several practical limitations. First, the current bi-polar or undivided cell technologies that are used to produce sodium hypochlorite cannot effectively handle the calcium and magnesium ions often contained in the salt solutions fed into the hypochlorite cells. As a result, without being limited to any one theory, it is believed that these ions begin to detrimentally effect the cells, in some cases causing formation of hydroxide precipitates and scale in process equipment, including within the cells themselves. This creates a requirement of timely and frequent cleaning of the cells to remove the scale and precipitate, thus adding servicing downtime as a practical limit to the production of sodium hypochlorite and adding further costs in the form of expenditures of resources and time in effecting such servicing. The cleaning processes used generally involve the use of hydrochloric acid which then generates additional chemical waste for disposal, thus incurring still further cost. If the cells are not cleaned in a timely fashion, however, the solid scale may penetrate between the electrodes and then potentially lead to short-circuiting of the electrodes, thus compromising the safety of the cell.

In addition to the above, it should be noted that the bi-polar or undivided cell process generates $H_2$ gas mixed with $Cl_2$ and other gases in combination. $H_2$ gas is a highly valued energy resource, but it is impractical to recover it from the complex gas mixture output by currently-used hypochlorite cells, and it is, therefore, simply released, thereby wasting it.

One available alternative to the currently-used processes is an electrolytic membrane process using an organic membrane (such as Nafion). Such organic membrane-based processes often suffer from short membrane lifetime because calcium and magnesium ions originally present in the feed solution precipitate within the membranes, fouling them and reducing their efficiency and performance.

Thus, it would be an improvement in the art to provide a novel electrochemical process for generating sodium hypochlorite from a variety of sodium chloride input solutions, including seawater, that may be more efficient than currently-used processes, and which may generate less waste. It would be a further benefit in the art to provide a process for producing sodium hypochlorite that is resistant to fouling from the calcium and magnesium ions commonly found in such feed streams. It would be a further benefit in the art to provide a process for producing sodium hypochlorite that enables hydrogen gas to be practically recovered as a product.

Such processes and devices for conducting such processes are disclosed herein.

BRIEF SUMMARY OF THE INVENTION

The present invention provides processes and apparatus for the electrochemical production of sodium hypochlorite using a sodium ion conductive ceramic membrane. One presently preferred type of sodium ion conductive ceramic membrane includes sodium super ionic conductor (hereinafter "NaSICON") membrane technologies. The processes and apparatus of the present invention may provide the capability of continually generating sodium hypochlorite from a feed containing aqueous sodium chloride. The aqueous sodium chloride feed may be pure or impure, such as seawater or brine.

In the electrochemical processes within the scope of the present invention, the sodium chloride feed is introduced into the anolyte compartment of an electrolytic cell. A sodium ion conductive ceramic membrane separates the anolyte compartment from the catholyte compartment. Water or a low concentration sodium hydroxide solution is fed to the catholyte compartment of the electrolytic cell. In some embodiments of the electrolytic cells and processes within the scope of the present invention, the anode may be titanium coated with advanced metal films referred to in the art as a "dimensionally stable anode" (hereinafter "DSA"), and the cathode may be a nickel/stainless steel alloy.

Under the influence of electric potential, electrochemical conversion occurs through simultaneous reactions at both electrodes: the oxidation of chloride ions present in the anolyte solution at the anode to form chlorine gas, and the reduction of water at the cathode to form hydroxyl ions. As the electrode reactions occur, sodium ions are transported from the anolyte compartment across the sodium ion conductive ceramic membrane into the catholyte compartment. Some sodium hydroxide produced in the catholyte compartment is transported to the anolyte compartment. The various reactions occurring within the electrolytic cell to produce sodium hypochlorite are presented below.

| | |
|---|---|
| At the anode/ anolyte compartment: | $2Cl^- \rightarrow Cl_2 + 2e^-$ |
| | $Cl_2 + H_2O \rightarrow HOCl + HCl$ |
| | $HOCl + HCl + 2NaOH \rightarrow NaOCl + NaCl + 2H_2O$ |
| At the cathode/ catholyte compartment: | $2H_2O + 2e^- \rightarrow 2OH^- + H_2$ |
| | $2Na^+ + 2OH^- \rightarrow 2NaOH$ |
| Overall reaction: | $2NaCl + H_2O \rightarrow NaOCl + NaCl + H_2$ |

Other advantages and aspects of the present invention will become apparent upon reading the following description of the drawings and detailed description of the invention. These and other features and advantages of the present invention will become more fully apparent from the following figures, description, and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
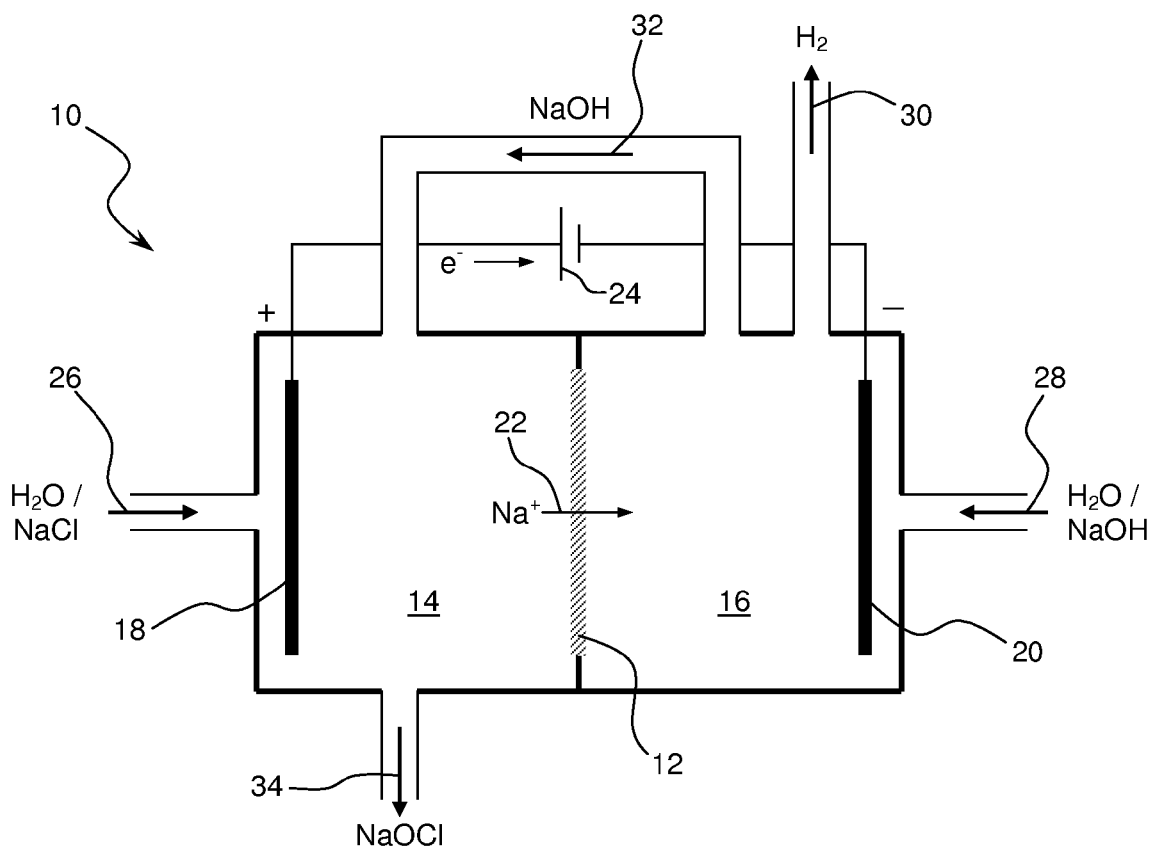
FIG. 1 is a schematic view of an embodiment of an electrolytic cell for producing sodium hypochlorite within the scope of the present invention.
Figure 2:
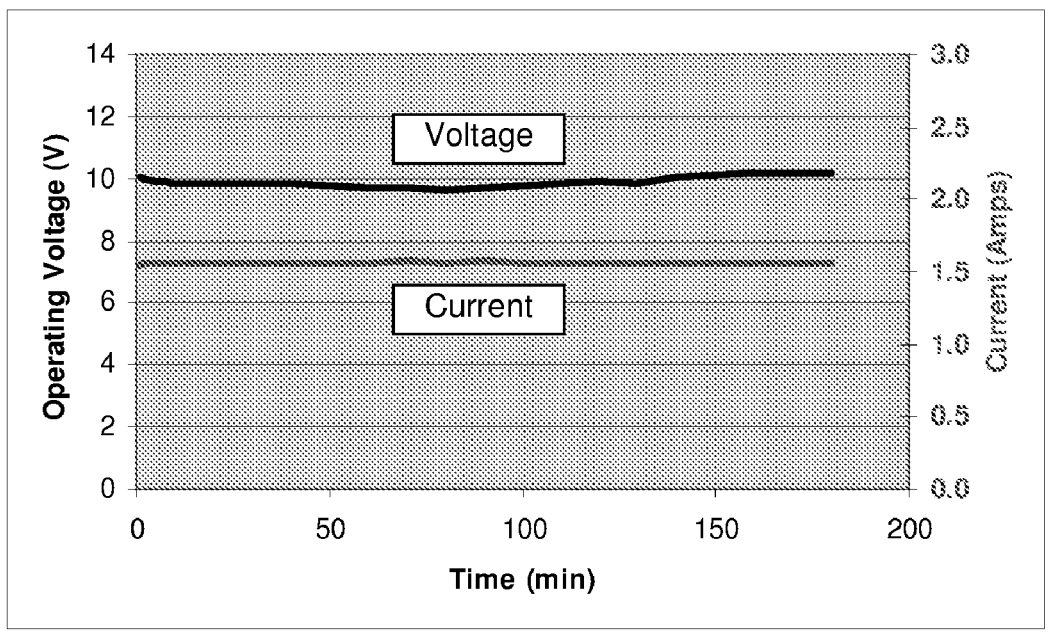
FIG. 2 shows a graph of the operation of a sodium hypochlorite production cell of Example 1.
Figure 3:
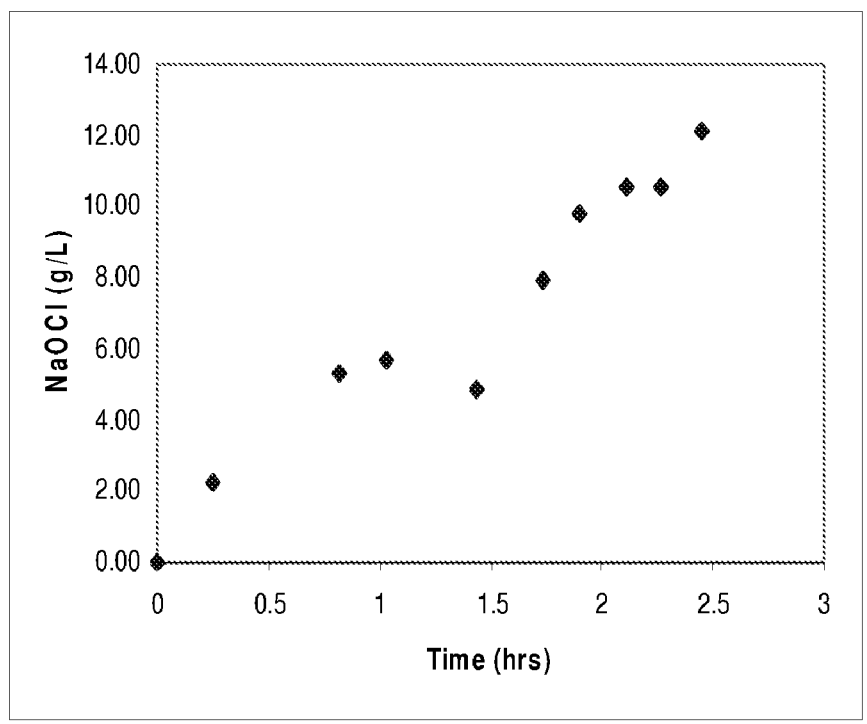
FIG. 3 shows a graph of the rate of sodium hypochlorite production of the cell of Example 2.
Figure 4:
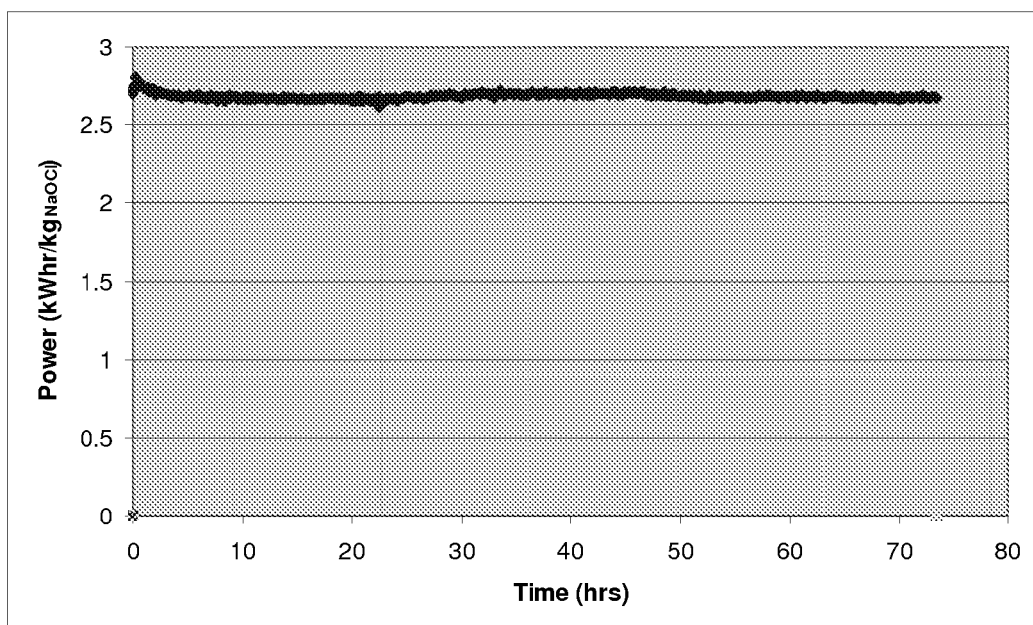
FIG. 4 shows a graph of the energy required for sodium hypochlorite produced in the cell of Example 3.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the electrolytic processes for producing sodium hypochlorite using sodium ion conductive ceramic membrane, as represented in FIGS. 1 through 13, is not intended to limit the scope of the invention, as claimed, but is merely representative of presently preferred embodiments of the invention.

The phrase "substantially impermeable to water," when used in the instant application to refer to a membrane, means that a small amount of water may pass through the membrane, but that the amount that passes through is not of a quantity to diminish the usefulness of the present invention. The phrase "essentially impermeable to water," as used herein in reference to a membrane, means that no water passes through the membrane, or that if water passes through the membrane, its passage is so limited so as to be undetectable by conventional means. The words "substantially" and "essentially" are used similarly as intensifiers in other places within this specification.

Electrode materials useful in the methods and apparatus of the present invention are electrical conductors and are generally substantially stable in the media to which they are exposed. Any suitable electrode material, or combination of electrode materials, known to one of ordinary skill in the art may be used within the scope of the present invention. In some specific embodiments, the anode material may include at least one of the following: dimensionally stable anode (DSA, generally comprising ruthenium oxide-coated-titanium or $RuO_2/Ti$), nickel, cobalt, nickel tungstate, nickel titanate, platinum and other noble metals, noble metals plated on a substrate such as platinum-plated titanium, metal oxides based on titanium, stainless steel, lead, lead dioxides, graphite, tungsten carbide and titanium diboride. In some specific embodiments, the cathode material may include at least one of the following: nickel, cobalt, platinum, silver, alloys such as titanium carbide with small amounts (in some instances up to about 3 weight %) of nickel, $FeAl_3$, $NiAl_3$, stainless steel, perovskite ceramics, and graphite. In some embodiments, the electrodes may be chosen to maximize cost effectiveness by balancing the electrical efficiency of the electrodes against their cost.

The electrode material may be in any suitable form within the scope of the present invention, as would be understood by one of ordinary skill in the art. In some specific embodiments, the form of the electrode materials may include at least one of the following: a dense or porous solid-form, a dense or porous layer plated onto a substrate, a perforated form, an expanded form including a mesh, or any combination thereof.

In some embodiments of the present invention, the electrode materials may be composites of electrode materials with non-electrode materials, where non-electrode materials are poor electrical conductors under the conditions of use. A variety of insulative non-electrode materials are also known in the art, as would be understood by one of ordinary skill in the art. In some specific embodiments, the non-electrode materials may include at least one of the following: ceramic materials, polymers, and/or plastics. These non-electrode materials may also be selected to be stable in the media to which they are intended to be exposed.

The ceramic membranes utilized in the processes and apparatus of the present invention are sodium ion-conductive, and physically separate the anolyte solution from the catholyte solution (by means of the dense-layer of the ceramic membrane). In one embodiment, it may be advantageous to employ ceramic membranes with low or even negligible electronic conductivity, in order to minimize any galvanic reactions that may occur when an applied potential or current is removed from the cell containing the ceramic membrane. In some embodiments of the present invention it may be advantageous to employ ceramic membranes that are substantially impermeable to at least the solvent components of both the catholyte and anolyte solutions.

In some specific embodiments, the sodium ion conductive ceramic membrane may include at least one of the following features and use characteristics, as would be understood by one of ordinary skill in the art: a solid form; a sodium ion conductivity at temperatures below about 100° C.; low electronic conductivity; a sodium ion transfer efficiency (i.e. high transference number) greater than about 90%; a high selectivity for sodium cations (e.g. Na$^+$) in relation to other alkali or non-alkali cations; stability in solutions of sodium ion containing salts and chemicals of weak or strong organic or inorganic acids; a density greater than about 95% of theoretical density value; substantially impermeable to water transport; resistant to acid, alkaline, caustic and/or corrosive chemicals.

In some embodiments of the ceramic membrane of the present invention, the ceramic membrane may not be substantially influenced by scaling, fouling or precipitation of species incorporating divalent cations, trivalent cations, and tetravalent cations; or by dissolved solids present in the solutions.

A variety of sodium ion conductive ceramic materials are known in the art and would be suitable for constructing the ceramic membrane of the present invention, as would be understood by one of ordinary skill in the art. In an embodiment of the present invention, a sodium ion conductive ceramic material may be a solid electrolyte material that is an electronic insulator and an ionic conductor. In many embodiments, the sodium ion conductive ceramic materials are substantially stable in the media to which they are exposed. Other suitable materials are known to one of ordinary skill in the art and would be suitable for practice of the present invention. In some embodiments of the sodium ion conductive ceramic materials of the present invention, the sodium ion conductive ceramic materials may have a sodium ion conductivity ranging from about $1\times10^{-4}$ S/cm to about $1\times10^{-1}$ S/cm measured from ambient temperature to about 85° C. and sodium transfer efficiency greater than about 90%.

In some specific embodiments, the ceramic membrane may comprise two or more co-joined layers of different sodium ion conductive ceramic materials. Such co-joined ceramic membrane layers could include NaSICON-type materials joined to other ceramics, such as, but not limited to, beta-alumina. Such layers could be joined to each other using a method such as, but not limited to, co-firing, joining following sintering, etc. Other suitable joining methods are known by one of ordinary skill in the art and are included herein.

In some embodiments of the sodium ion conductive ceramic materials of the present invention, the sodium ion conductive ceramic materials may be NaSICON-type materials. In some specific embodiments, the NaSICON-type materials may include at least one of the following: materials of general formula $Na_{1+x}M^I{}_2Si_xP_{3-x}O_{12}$ where $0 \leq x \leq 3$, and where $M^I$ is selected from the group consisting of Zr, Ge, Ti, Sn, or Hf, or mixtures thereof; materials of general formula $Na_{1+z}L_zZr_{2-z}P_3O_{12}$ where $0 \leq z \leq 2.0$, and where L is selected from the group consisting of Cr, Yb, Er, Dy, Sc, Fe, In, or Y, or mixtures thereof; materials of general formula $Na_5RESi_4O_{12}$, and where RE is Y or any rare earth element.

In some specific embodiments, the NaSICON-type materials may include at least one of the following: materials of general formula $Na_5RESi_4O_{12}$ and non-stoichiometric sodium-deficient materials of general formula $(Na_5RESi_4O_{12})_{1-\delta}(RE_2O_3 \cdot 2SiO_2)_\delta$, where RE is Nd, Dy, or Sm, or any mixture thereof and where δ is the measure of deviation from stoichiometry, as disclosed in U.S. Pat. No. 5,580,430, and as explicitly incorporated herein by this reference in its entirety. In some specific embodiments, the NaSICON-type materials may include at least one of the following: non-stoichiometric materials, zirconium-deficient (or sodium rich) materials of general formula $Na_{1+x}Zr_{2-x/3}Si_xP_{3-x}O_{12-2x/3}$ where $1.55 \leq x \leq 3$.

In some specific embodiments, the NaSICON-type materials may include at least one of the following: non-stoichiometric materials, sodium-deficient materials of general formula $Na_{1+x}(A_yZr_{2-y})(Si_zP_{3-z})O_{12-\delta}$ where A is selected from the group consisting of Yb, Er, Dy, Sc, In, or Y, or mixtures thereof, $1.8 \leq x \leq 2.6$, $0 \leq y \leq 0.2$, $x \leq z$, and δ is selected to maintain charge neutrality. In some specific embodiments, the NaSICON-type materials may include sodium-deficient materials of formula $Na_{3.1}Zr_2Si_{2.3}P_{0.7}O_{12-\delta}$.

Other exemplary NaSICON-type materials are described by H. Y-P. Hong in "Crystal structures and crystal chemistry in the system $Na_{1+x}Zr_2Si_xP_{3-x}O_{12}$," Materials Research Bulletin, Vol. 11, pp. 173-182, 1976; J. B. Goodenough et al., in "Fast Na$^+$-ion transport skeleton structures," Materials Research Bulletin, Vol. 11, pp. 203-220, 1976; J. J. Bentzen et al., in "The preparation and characterization of dense, highly conductive $Na_5GdSi_4O_{12}$ nasicon (NGS)," Materials Research Bulletin, Vol. 15, pp. 1737-1745, 1980; C. Delmas et al., in "Crystal chemistry of the $Na_{1+x}Zr_{2-x}L_x(PO_4)_3$ (L=Cr, In, Yb) solid solutions," Materials Research Bulletin, Vol. 16, pp. 285-290, 1981; V. von Alpen et al., in "Compositional dependence of the electrochemical and structural parameters in the NASICON system $(Na_{1+x}Si_xZr_2P_{3-x}O_{12})$," Solid State Ionics, Vol. 3/4, pp. 215-218, 1981; S. Fujitsu et al., in "Conduction paths in sintered ionic conductive material $Na_{1+x}Y_xZr_{2-x}(PO_4)_3$," Materials Research Bulletin, Vol. 16, pp. 1299-1309, 1981; Y. Saito et al., in "Ionic conductivity of NASICON-type conductors $Na_{1.5}M_{0.5}Zr_{1.5}(PO_4)_3$ (M: Al$^{3+}$, Ga$^{3+}$, Cr$^{3+}$, Sc$^{3+}$, Fe$^{3+}$, In$^{3+}$, Yb$^{3+}$, Y$^{3+}$)," Solid State Ionics, Vol. 58, pp. 327-331, 1992; J. Alamo in "Chemistry and properties of solids with the [NZP] skeleton," Solid State Ionics, Vol. 63-65, pp. 547-561, 1993; K. Shimazu in "Electrical conductivity and Ti$^{4+}$ ion substitution range in NASICON system," Solid State Ionics, Vol. 79, pp. 106-110, 1995; Y. Miyajima in "Ionic conductivity of NASICON-type $Na_{1+x}M_xZr_{2-x}P_3O_{12}$ (M: Yb, Er, Dy)," Solid State Ionics, Vol. 84, pp. 61-64, 1996. These references are incorporated in their entirety herein by this reference.

The ceramic membranes may be used or produced for use in the processes and apparatus of the present invention in any suitable form, as would be understood by one of ordinary skill in the art. In some specific embodiments, the form of the ceramic membranes may include at least one of the following: monolithic flat plate geometries, supported structures in flat plate geometries, monolithic tubular geometries, supported structures in tubular geometries, monolithic honeycomb geometries, or supported structures in honeycomb geometries. Supported structures may comprise dense layers of sodium ion conductive ceramic materials supported on porous supports. A variety of forms for the porous supports are known in the art and would be suitable for providing the porous supports for ceramic membranes with supported structures, including: ceramic layers sintered to below full density with resultant continuous open porosity, slotted-form layers, perforated-form layers, expanded-form layers including a mesh, or combinations thereof. In some embodiments, the porosity of the porous supports is substantially continuous open-porosity so that the liquid solutions on either side of the ceramic membrane may be in intimate contact with a large area of the dense-layers of sodium ion conductive ceramic materials, and in some, the continuous open-porosity ranges from about 30 volume % to about 90 volume %. In some embodiments of the present invention, the porous supports for the supported structures may be present on one side of the dense layer of sodium ion conductive ceramic material. In some embodiments of the present invention, the porous supports for the supported structures may be present on both sides of the dense layer of sodium ion conductive ceramic material.

A variety of materials for the porous supports are known in the art and would be suitable for providing the porous supports for ceramic membranes with supported-structures, including: electrode materials, NaSICON-type materials, $\beta'$-alumina, $\beta''$-alumina, other cation-conductive materials, and non-conductive materials such as plastics or ceramic materials, metals, and metal alloys. The thickness of the dense layer of sodium ion conductive ceramic material in monolithic structures is generally from about 0.3 mm to about 5 mm, and in some instances from about 0.1 mm to about 1.5 mm. The thickness of the dense layer of sodium ion conductive ceramic material in supported structures is generally from about 25 µm to about 2 mm, and often from about 0.5 mm to about 1.5 mm. Layers as thin as about 25 µm to about 0.5 mm are readily producible, as would be understood by one of ordinary skill in the art. In some specific embodiments, the ceramic membranes are structurally supported by the cathode and the anode, each of which is porous. This may dictate characteristics of both the form of the membranes, and/or of the cathode and/or anode. In some specific embodiments, the porous substrate must have similar thermal expansion and good bonding with the membrane as well as good mechanical strength. One of ordinary skill in the art would understand that the number and configuration of the layers used to construct the ceramic membrane as supported-structures could be widely varied within the scope of the invention.

In some embodiments of the ceramic membranes of the present invention, the ceramic membranes may be composites of sodium ion conductive ceramic materials with non-conductive materials, where the non-conductive materials are poor ionic and electronic electrical conductors under the conditions of use. A variety of insulative non-conductive materials are also known in the art, as would be understood by one of ordinary skill in the art. In some specific embodiments, the non-conductive materials may include at least one of the following: ceramic materials, polymers, and/or plastics that are substantially stable in the media to which they are exposed.

Layered ceramic-polymer composite membranes are also particularly suitable for use as ceramic membranes in the present invention, such as, but not limited to, those disclosed in U.S. Pat. No. 5,290,405, which is incorporated herein in its entirety by this reference. Layered ceramic-polymer composite membranes generally comprise ionic-selective polymers layered on sodium ion conductive ceramic materials. In some specific embodiments, the sodium ion conductive ceramic materials of the layered ceramic-polymer composite membranes may include at least one of the following: NaSICON-type materials or beta-alumina. Ion-selective polymer materials have the disadvantage of having poor selectively to sodium ions, yet they demonstrate the advantage of high chemical stability. Therefore, layered ceramic-polymer composite membranes of sodium ion conductive ceramic materials with chemically stable ionic-selective polymer layers may be suitable for use in the present invention. In some specific embodiments, the types of ion-selective polymer materials which may be used in the layered ceramic-polymer composite structure may include at least one of the following: polyelectrolyte perfluorinated sulfonic polymers, polyelectrolyte carboxylic acid polymers, Nafion™ materials (from DuPont Fluoroproducts, Fayetteville, N.C.) and polyvinyl chloride (PVC), matrix-based polymers, co-polymers or block-co-polymers.

In some specific embodiments, the polymers for the layered ceramic-polymer composite membranes may include at least one of the following features and use characteristics, as would be understood by one of ordinary skill in the art: high chemical stability; high ionic conductivity; good adhesion to ceramic materials; and/or insensitivity to impurity contamination.

It is not necessary for either the cathode or anode to contact the ceramic membrane in the processes or apparatus of the present invention. Both the catholyte and anolyte solutions are ion-conductive so that from an electrical standpoint the electrodes may be remote from the sodium ion conductive ceramic membrane. In such an event, a thin-film dense ceramic membrane may be deposited on a porous substrate which does not have to be an electrode.

One of ordinary skill in the art would understand that a number of ceramic powder processing methods are known for processing of the sodium ion conductive ceramic materials such as high temperature solid-state reaction processes, co-precipitation processes, hydrothermal processes, or sol-gel processes. In some embodiments of the present invention it may be advantageous to synthesize the sodium ion conductive ceramic materials by high temperature solid-state reaction processes. Specifically, for NaSICON-type materials, a mixture of starting precursors such as simple oxides and/or carbonates of the individual components may be mixed at the desired proportions in methanol in polyethylene vessels, and dried at approximately 60° C. to evolve the solvent; the dried mixture of starting precursors may be calcined in the range of from about 800° C. to about 1200° C. dependent on the composition, followed by milling of the calcined powder with media such as stabilized-zirconia or alumina or another media known to one of ordinary skill in the art to achieve the prerequisite particle size distribution. To achieve the prerequisite particle size distribution, the calcined powder may be milled using a technique such as vibratory milling, attrition milling, jet milling, ball milling, or another technique known to one of ordinary skill in the art, using media (as appropriate) such as stabilized-zirconia or alumina or another media known to one of ordinary skill in the art.

One of ordinary skill in the art would understand that a number of polymers are known for processing with ceramic powders such as those set forth above as prerequisite for preparing a green-form. Such polymers include, but are not limited to, polyacrylates, polyvinyl butyral, polyvinyl alcohol, poly(alkylene carbonate), Polyethylene glycols, DURAMAX™ binders (Rohm and Haas Company, Philadelphia, Pa.), and POLYOX™ Resins (Dow Chemical Company, Midland, Mich.).

One of ordinary skill in the art would understand that a number of conventional ceramic fabrication processing methods are known for processing ceramic membranes such as those set forth above in a green-form. Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol gel processing. The resulting green form ceramic membrane may then be sintered to form a ceramic membrane using a technique known to one of ordinary skill in the art, such as conventional thermal processing in air, or controlled atmospheres to minimize loss of individual components of the ceramic membranes.

In some embodiments of the present invention it may be advantageous to fabricate the ceramic membrane in a green form by die-pressing, optionally followed by isostatic pressing. In other embodiments of the present invention it may potentially be advantageous to fabricate the ceramic membrane as a multi-channel device in a green form using a combination of techniques such as tape casting, punching, laser-cutting, solvent bonding, heat lamination, or other techniques known to one of ordinary skill in the art. Specifically, for NaSICON-type materials, a ceramic membrane in a green-form may be green-formed by pressing in a die, followed by isostatic pressing and then sintering in air in the range of from about 925° C. to about 1300° C. for up to about 8 hours to make sintered ceramic membrane structures with dense layers of alkali cation-conductive ceramic materials. Standard X-ray diffraction analysis techniques may be performed to identify the crystal structure and phase purity of the alkali cation-conductive ceramic materials in the sintered ceramic membrane.

In some specific embodiments, ceramic membranes for use in the processes and apparatus of the present invention may be fabricated by a vapor deposition method onto a porous support, including at least one of the following methods: physical vapor deposition, chemical vapor deposition, sputtering, thermal spraying, or plasma spraying. The thickness of the ceramic membrane formed by a vapor deposition method onto a porous support is generally from about 1 µm to about 100 µm, but may be varied as is known to one of ordinary skill in the art.

One embodiment of an electrolytic cell that may be used in the electrochemical process to made sodium hypochlorite is illustrated in FIG. 1. The electrolytic cell 10 uses a sodium ion conductive ceramic membrane 12 that divides the electrochemical cell 10 into two compartments: an anolyte compartment 14 and a catholyte compartment 16. An electrochemically active anode 18 is housed in the anolyte compartment 14 where oxidation reactions take place, and an electrochemically active cathode 20 is housed in the catholyte compartment 16 where reduction reactions take place. The sodium ion conductive ceramic membrane 12 selectively transfers sodium ions 22 from the anolyte compartment 14 to the catholyte compartment 16 under the influence of an electrical potential 24 while preventing water transportation from either compartment to the other side.

The electrolytic cell 10 is operated by feeding an aqueous sodium chloride solution 26 into the anolyte compartment 14. The sodium chloride solution 26 may come from any source, including naturally occurring seawater or brine sources. The sodium chloride solution may be prepared by dissolving salt containing sodium chloride in water. The water need not be pure de-ionized water, but it can be tap water or unpurified water from any source. The concentration of sodium chloride in the aqueous solution should be below its saturation limit in water. The concentration of sodium chloride in the aqueous solution is between about 0.1% by weight and about 26% by weight of the solution, and more preferably between about 3% by weight and 26% by weight of the solution.

Water 28 is fed into the catholyte compartment 16. At least initially, the water 28 preferably includes sodium ions, which may be in the form of an unsaturated sodium hydroxide solution. The concentration of sodium hydroxide is between about 0.1% by weight and about 50% by weight of the solution. In one embodiment, the water 28 includes a dilute solution of sodium hydroxide. During operation, the source of sodium ions may be provided by sodium ions 22 transporting across the sodium ion conductive ceramic membrane 12 from the anolyte compartment 14 to the catholyte compartment 16.

The anode 18 may be fabricated of various materials, including those discussed above. In one embodiment, the anode 18 is fabricated of titanium coated with advanced metal oxides. The cathode 20 may also be fabricated of various materials, including those discussed above. In one embodiment, the cathode 20 is fabricated of nickel/stainless steel. Under the influence of electric potential 24, electrochemical reactions take place at the anode 18 and cathode 20. Oxidation of chloride ions to chlorine gas occurs at the anode 18, and reduction of water to form hydrogen gas 30 and hydroxyl ions occurs at the cathode 20.

As the reactions occur at the electrodes, sodium ions 22 are transported from the anolyte compartment 14 across the sodium ion conductive ceramic membrane 12 into the catholyte compartment 16. If non-sodium ions, such as protons, calcium, magnesium, etc, are also present in the anolyte compartment 14, they are prevented from moving to the catholyte compartment 16 by the solid electrolyte 12 due to ionic size differences and electroneutrality constraints when compared with the sodium ions. Due to this reason, the current efficiency is expected to be between from about 95 to about 100% in some embodiments. The transported sodium ions 22 combine with the hydroxyl ions produced by the reduction of water at the cathode 20 to form a sodium hydroxide solution. Part of this sodium hydroxide solution 32 is transported to the anolyte compartment 14 of the cell to control anolyte pH and produce sodium hypochlorite solution. Sodium hypochlorite solution 34 may be removed from the anolyte compartment 14. In some embodiments, the solution comprising sodium hypochlorite is removed from the anolyte compartment 14 for on-site use. As used herein, the term on-site use refers to use of the produced sodium hypochlorite in a personal, commercial or industrial process located proximate to the electrolytic cell, so that expensive storage or transportation facilities for the sodium hypochlorite are not required.

The chemical reactions in the electrochemical cell 10 are summarized below:

| | |
|---|---|
| At the anode/ anolyte compartment: | $2Cl^- \rightarrow Cl_2 + 2e^-$ |
| | $Cl_2 + H_2O \rightarrow HOCl + HCl$ |
| | $HOCl + HCl + 2NaOH \rightarrow NaOCl + NaCl + 2H_2O$ |
| At the cathode/ catholyte compartment: | $2H_2O + 2e^- \rightarrow 2OH^- + H_2$ |
| | $2Na^+ + 2OH^- \rightarrow 2NaOH$ |
| Overall reaction: | $2NaCl + H_2O \rightarrow NaOCl + NaCl + H_2$ |

The pH control of the anolyte solution is especially important when feed to the anolyte solution is an impure sodium chloride solution containing calcium, magnesium, or other precipitable cations. Such sodium chloride solutions include, but are not limited to, seawater, brine, industrial process streams, or salt solutions containing sodium chloride. Such salt solutions may be prepared with pure or impure salt or with pure or impure water. The pH of the solution within the anolyte compartment 14 is preferably maintained at a pH less than 14, usually in preferred pH in the range from 7 to 12. Because calcium and magnesium precipitate at a pH greater than about 8, it is preferred to maintain the pH less than about 8 when operating with impure sodium chloride solutions. For pure sodium chloride solutions, the anolyte solution may have higher pH. With pH control, precipitation reactions at the anode, formation of calcium and magnesium hydroxides, may be avoided, thereby producing a clear solution of sodium hypochlorite.

The sodium conductive ceramic membrane 12 preferably blocks diffusion of calcium or magnesium ions to the catholyte compartment 16 during electrolysis. Thus, precipitation of calcium and magnesium is avoided in the catholyte compartment. In contrast, precipitation is unpreventable with organic membranes, such as Nafion® membranes, as they are, unlike NaSICON membranes, not able to completely prevent the diffusion of calcium and magnesium ions to the catholyte compartment 16, causing precipitation of calcium and magnesium not only in the catholyte compartment 16 but also in the interstices of membrane, gradually eroding the membrane's effectiveness. This drawback of the organic membranes limits their use in sodium hypochlorite generation to only salt solution feeds containing just sodium chloride.

The voltage required by the electrolytic cell 10, at constant current, is dependant on factors such as concentration of anolyte (sodium chloride solution), concentration of catholyte (sodium hydroxide solution), membrane thickness, conductivity of the membrane, and local mass transfer conditions which dictate the electrolytic cell's power consumption for a given production rate of sodium hypochlorite.

The cell can be operated in a continuous or batch mode. In one embodiment of the processes and apparatus of the present invention, the electrolytic cell 10 may be operated in a continuous mode. In a continuous mode, the cell is initially filled with anolyte and catholyte solutions and then, during operation, additional solutions are fed into the cell and products, by-products, and/or diluted solutions are removed from the cell without ceasing operation of the cell. The reactant solutions may be fed into the anolyte and catholyte compartments continuously or they may be fed intermittently, meaning that the flow of a given solution is initiated or stopped according to the need for the solution and/or to maintain desired concentrations of solutions in the cell, without emptying one or both compartments. Similarly, the removal of solutions from the anolyte compartment 14 and the catholyte compartment 16 may also be continuous or intermittent. Control of the addition and/or removal of solutions from the cell may be done by any suitable means. Such means include manual operation, such as by one or more human operators, and automated operation, such as by using sensors, electronic valves, laboratory robots, etc. operating under computer or analog control. In automated operation, a valve or stopcock may be opened or closed according to a signal received from a computer or electronic controller on the basis of a timer, the output of a sensor, or other means. Examples of automated systems are well known in the art. Some combination of manual and automated operation may also be used. Alternatively, the amount of each solution that is to be added or removed per unit time to maintain a steady state may be experimentally determined for a given cell, and the flow of solutions into and out of the system set accordingly to achieve the steady state flow conditions. The concentration of the produced sodium hypochlorite will typically range between 1% and 20% by weight of solution, or more.

In another embodiment, the system is operated in batch mode. In batch mode, the anolyte and catholyte solutions are fed into the electrolytic cell 10 and the cell is operated until the desired concentration of product is produced in the anolyte compartment 14 and catholyte compartment 16. The electrolytic cell 10 is then emptied, the product collected, and the cell refilled to start the process again. Alternatively, combinations of continuous mode and batch mode production may be used. Also, in either mode, the feeding of solutions may be done using a pre-prepared solution or using components that form the solution in situ.

It should be noted that both continuous and batch mode have dynamic flow of solutions. In continuous mode, the anolyte make up solution is added so the sodium concentration is maintained at a certain concentration or concentration range. The operation is stopped when the appropriate product concentration is reached in the catholyte.

The hydrogen gas 30 generated at the cathode 20 is pure unlike gas generated in the undivided cell, which is a mixture of various gases: hydrogen, oxygen, and oxides of chlorine. Availability of the uncontaminated hydrogen gas 30 is a significant advantage of the electrolytic cell 10 within the scope of the present invention, not provided by the undivided cell. The hydrogen gas 30 may provide fuel to an alternative energy generating process, such as a PEM fuel cell or other device known to one of ordinary skill in the art for energy generation. This may help offset the energy requirements to operate the electrolytic process. The hydrogen gas 30 collected from the cathode 16 may be used for chemical processing operations known to one of ordinary skill in the art.

The transfer of sodium hydroxide 32 from the catholyte compartment 16 to the anolyte compartment 14 may be automatically controlled using any of the available means known to one of ordinary skill in the art to maintain solution pH in the anolyte below the levels at which precipitation of calcium and magnesium usually occurs, consequently avoiding their precipitation in the cell. The substantial impermeability of the ceramic membrane 12 to the diffusion of calcium and magnesium ions will prevent their precipitating out of solution as hydroxides on the catholyte side of the membrane. Precipitation is unpreventable when organic membranes are used because they are not completely impervious to the calcium and magnesium diffusion.

In one embodiment, the electrolytic process utilizing a NaSICON-type material based ceramic membrane may overcome shortcomings of currently-used open cell bipolar process. By using the NaSICON-type materials in the ceramic membrane cell, it is thought that in some embodiments, one may achieve high current efficiencies, including, in some cases, but not limited to, over 90%, since such systems substantially do not allow back-migration of hydroxyl ions from the catholyte side of the cell to the anolyte side. It may offer the advantage of membrane longevity since the NaSICON-type materials based ceramic membranes taught in the present invention may be substantially immune to the corrosive nature of the seawater or sodium chlorite.

Several examples are provided below which discuss the construction, use, and testing of specific embodiments of the present invention. These embodiments are exemplary in nature and should not be construed to limit the scope of the invention in any way.

EXAMPLE 1

Production of sodium hypochlorite with 4 weight percent NaCl aqueous solution.

A short term test to demonstrate the production of sodium hypochlorite with 4 wt. % NaCl anolyte solution in a two compartment electrochemical cell assembly was performed. A 14 cm$^2$ ceramic membrane of the NaSICON-type material composition $Na_{3.4}Zr_2Si_{2.4}P_{0.6}O_{12}$ was assembled in a two compartment electrochemical cell.

The anolyte feed was 4 wt. % aqueous NaCl solution and aqueous NaOH dripped into the anolyte compartment from the catholyte compartment of the cell operating in steady state mode to promote the secondary reaction. The anolyte and catholyte feed operated at 23° C. The operation characteristics are presented in Table 1, and the cell operation is presented in FIG. 2

TABLE 1

| | |
|---|---|
| Anolyte initial concentration | Anolyte: 4 wt. % NaCl solution |
| Catholyte initial concentration | Catholyte: 15 wt. % NaOH |
| Operating temperature | 22° C. |
| Current density | 0.77 amps/sq.in. |
| Sodium Hypochlorite concentration | 15.29 g/l of NaOCl |
| Sodium Hypochlorite production rate | 1.37 g · hr$^{-1}$ · A$^{-1}$ of NaOCl |
| Anolyte pH | Anolyte pH maintained at 7.5 |
| Ceramic Membrane | $Na_{3.4}Zr_2Si_{2.4}P_{0.6}O_{12}$ |

EXAMPLE 2

Production of sodium hypochlorite with seawater.

A short term test to demonstrate the production of sodium hypochlorite with seawater anolyte feed in a two compartment electrochemical cell assembly was performed. A 14 cm$^2$ ceramic membrane of the NaSICON-type material composition $Na_{3.1}Zr_2Si_{2.3}P_{0.7}O_{12-\delta}$ was first assembled in a two compartment electrochemical cell.

The sodium chloride solution introduced into the anolyte compartment was seawater. A low concentration of aqueous NaOH was dripped into the anolyte compartment of the cell operating in steady state mode to promote the secondary reaction formation of sodium hypochlorite. The catholyte feed was 0.25 M NaOH. The anolyte feed and the anolyte compartment were held at 15° C., and the catholyte feed and the catholyte compartment were held at 25° C. The cell was operated at constant current density of 1.48 amps/sq. inch conditions (230 mA/cm$^2$). The production rate of NaOCl is presented in FIG. 3.

At the operating current density, about 12 grams/liter of sodium hypochlorite were generated. Titration of the NaOCl chemical formed in the anolyte compartment was performed with sodium thiosulfate using potassium iodide and starch as indicators to determine the concentration of NaOCl generated.

EXAMPLE 3

Production of sodium hypochlorite with 26 wt % NaCl aqueous solution.

A test to demonstrate the production of sodium hypochlorite with 26 wt % aqueous NaCl anolyte solution in a two compartment electrochemical cell assembly was performed. A 14 cm$^2$ ceramic membrane of the NaSICON-type material composition $Na_{3.4}Zr_2Si_{2.4}P_{0.6}O_{12}$ was assembled in a two compartment electrochemical cell. Aqueous NaOH was dripped into the anolyte compartment from the catholyte compartment of the cell operating in steady state mode to promote the secondary reaction to form sodium hypochlorite in the anolyte compartment.

The cell was operated at steady state current density of 0.16 amps/sq. inch (25 mA/cm$^2$) at ambient conditions in a closed cell system. Operational conditions are presented in Table 2, and the cell performance is presented in FIG. 4.

TABLE 2

| | |
|---|---|
| Anolyte initial concentration | 26 wt. % NaCl, 0 wt. % NaOCl |
| Catholyte initial concentration | 19.82 wt. % |
| Operating temperature | 22° C. |
| Current density | 0.16 amps/sq. inch (25 mA/cm$^2$) |
| Final Anolyte concentration | 1.79 g/l of NaOCl = 0.15 wt. % |
| Final Catholyte concentration | 22.02 wt. % |
| Test duration | 74 hours |
| Anolyte pH | 7 to 9 |
| Ceramic Membrane | $Na_{3.4}Zr_2Si_{2.4}P_{0.6}O_{12}$ (1.42 mm thickness and 51.26 mm Diameter |

EXAMPLE 4

Production of sodium hypochlorite with synthesized sodium chloride solution.

Figure 5:
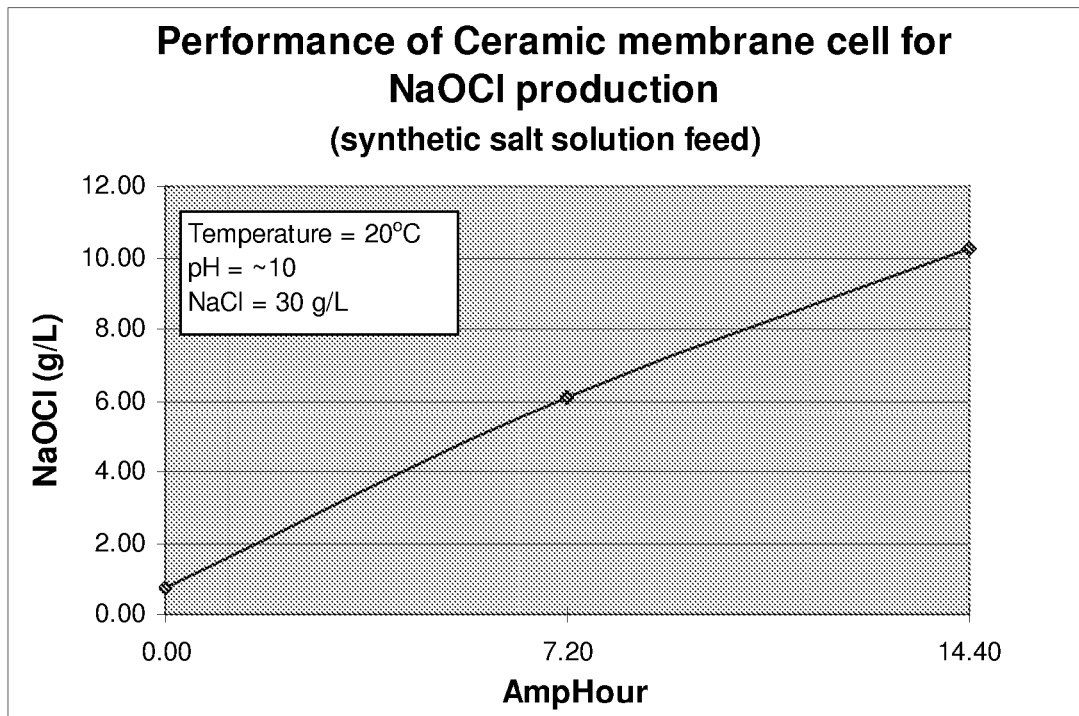
FIG. 5 shows a graph of the production of sodium hypochlorite as a function of Amp·Hours in the electrolytic cell as described in Example 4.

A test to demonstrate the production of sodium hypochlorite was performed with a synthetic salt solution. The salt solution was prepared with high quality sodium chloride salt and de-ionized water and introduced into the anolyte compartment of a two compartment electrochemical cell assembly as illustrated in FIG. 1. The sodium hydroxide solution for the catholyte compartment was prepared using reagent grade sodium hydroxide (50 wt % strength) diluted to the required concentration using de-ionized water. Operating parameters and results are presented in Table 3, below. The performance results are shown in FIG. 5, which indicate that the sodium ion conductive ceramic membrane-based cell is capable of making sodium hypochlorite efficiently.

TABLE 3

Performance of Ceramic Membrane Cell for NaOCl Production (synthetic seawater solution feed)

| Cell Parameters: | | Operating Parameters: | |
|---|---|---|---|
| Amps | 7.2 | Temperature | 20.0° C. |
| Anode | RuO$_2$ on Ti | pH | 10.0 |
| Cathode | SS | Anolyte | 30.0 g/L NaCl |
| Area (cm$^2$) | 60 | Catholyte | 15.0% NaOH |
| Membrane Thickness (mm) | 1.3 | | |
| Results: | | | |
| Anode % CE | 100.0% | | |
| Final NaOCl (g/L) | 10.2 | | |

TABLE 3-continued

Performance of Ceramic Membrane Cell for NaOCl Production
(synthetic seawater solution feed)

Mass Balance:

| Start | Volume (ml) | S.G. | Total wt (g) |
|---|---|---|---|
| Anolyte | 2000.00 | 1.010 | 2020.00 |
| Catholyte | 4000.00 | 1.135 | 4540.00 |
| totals: | 6000.00 | | 6560.00 |

| End | Volume (ml) | S.G. | Total wt (g) | Theoretical NaOCl amount (g) | Actual NaOCl amount (g) |
|---|---|---|---|---|---|
| Anolyte | 2000.00 | 1.002 | 2004.00 | 20.02 | 20.48 |
| Catholyte | 3950.00 | 1.139 | 4499.05 | | |
| totals: | 5950.00 | | 6503.05 | | |
| | | recovery: | 99.13% | | |

| Data: | | | | Anolyte | Catholyte |
|---|---|---|---|---|---|
| Operation | time (hrs) | Volts | Amphrs | temp °C. | temp °C. |
| Start | 0 | 10.2 | 0.00 | 21.0 | 28.0 |
| End | 2.00 | 11.8 | 14.40 | 20.0 | 29.0 |

EXAMPLE 5

Production of sodium hypochlorite with seawater.

Figure 6:
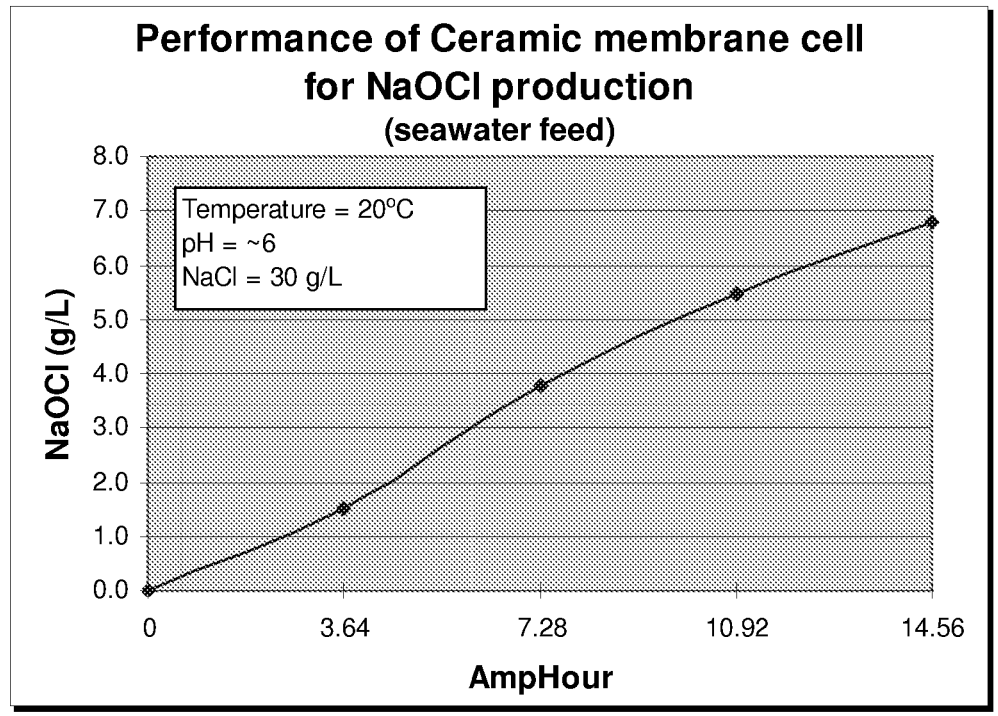
FIG. 6 shows a graph of the production of sodium hypochlorite as a function of Amp·Hours in the electrolytic cell as described in Example 5.

A test to demonstrate the production of sodium hypochlorite was performed with actual seawater introduced into the anolyte compartment of a two compartment electrochemical cell assembly as illustrated in FIG. 1. The operating parameters of the test and results are presented in Table 4. The results are also shown in FIG. 6, which shows that the ceramic membrane based cell is capable of making sodium hypochlorite from seawater.

TABLE 4

Performance of Ceramic membrane cell for NaOCl production
(seawater feed)

| Cell Parameters: | | Operating Parameters: | |
|---|---|---|---|
| Amps | 3.6 | Temperature | 19.0° C. |
| Anode | RuO₂ on Ti | pH | 6.0 |
| Cathode | SS | Anolyte | 30.0 g/L NaCl |
| Area (cm²) | 60 | Catholyte | 15.0% NaOH |
| Membrane Thickness (mm) | 1.3 | | |

Results:

| Anode % CE | 67.0% |
|---|---|
| Final NaOCl (g/L) | 6.8 |

Mass Balance:

| Start | Volume (ml) | S.G. | Total wt (g) |
|---|---|---|---|
| Anolyte | 2000.00 | 1.015 | 2030.00 |
| Catholyte | 2000.00 | 1.152 | 2304.00 |
| totals: | 4000.00 | | 4334.00 |

TABLE 4-continued

Performance of Ceramic membrane cell for NaOCl production
(seawater feed)

| End | Volume (ml) | S.G. | Total wt (g) | Theoretical NaOCl amount (g) | Actual NaOCl amount (g) |
|---|---|---|---|---|---|
| Anolyte | 2000.00 | 1.003 | 2006.00 | 20.20 | 13.60 |
| Catholyte | 2000.00 | 1.175 | 2350.00 | | |
| totals: | 4000.00 | | 4356.00 | | |
| | | recovery: | 100.51% | | |

| Data: | | | | Anolyte | Catholyte |
|---|---|---|---|---|---|
| Operation | time (hrs) | Volts | Amphrs | temp °C. | temp °C. |
| Start | 0 | 6.4 | 0.00 | 19.0 | 28.0 |
| End | 4.00 | 9.1 | 14.56 | 20.0 | 29.0 |

EXAMPLE 6

Comparison of performance of an undivided cell and a sodium ion conductive ceramic membrane based cell in producing sodium hypochlorite.

Figure 7:
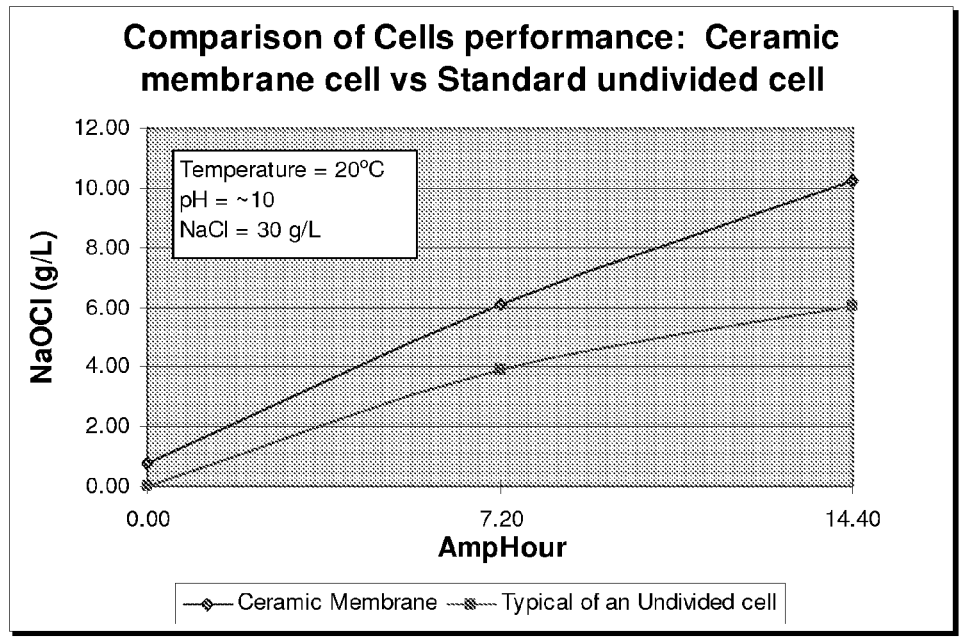
FIG. 7 shows a graph comparing the production of sodium hypochlorite as a function of Amp·Hours in an undivided electrolytic cell and in an electrolytic cell with a sodium ion conductive ceramic membrane as described in Example 6.
Figure 8:
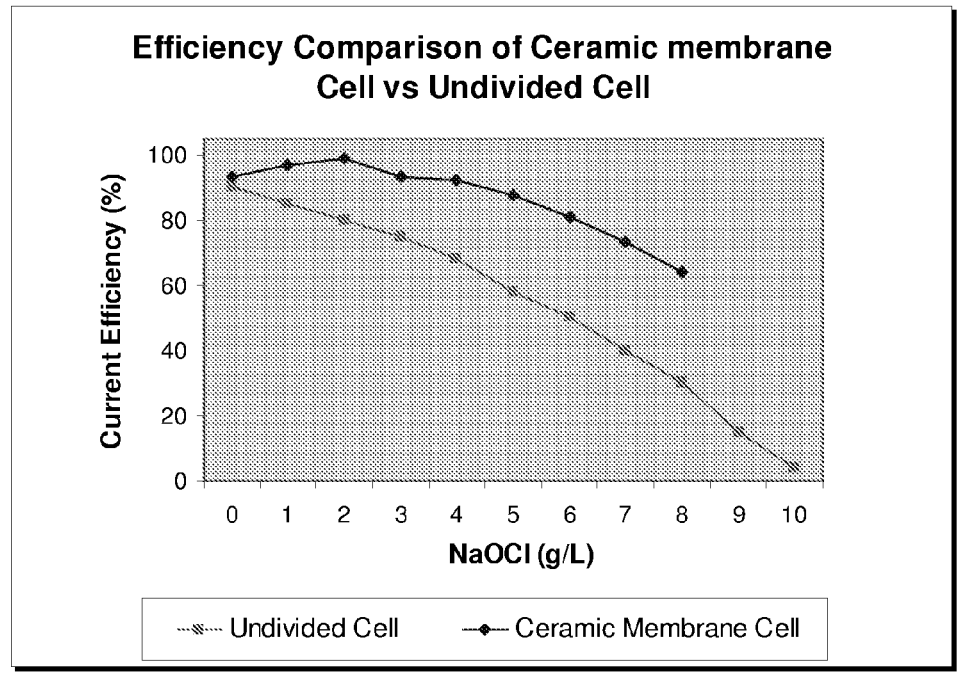
FIG. 8 shows a graph comparing current efficiency for the production of sodium hypochlorite in an undivided electrolytic cell and in an electrolytic cell with a sodium ion conductive ceramic membrane as described in Example 6.
Figure 9:
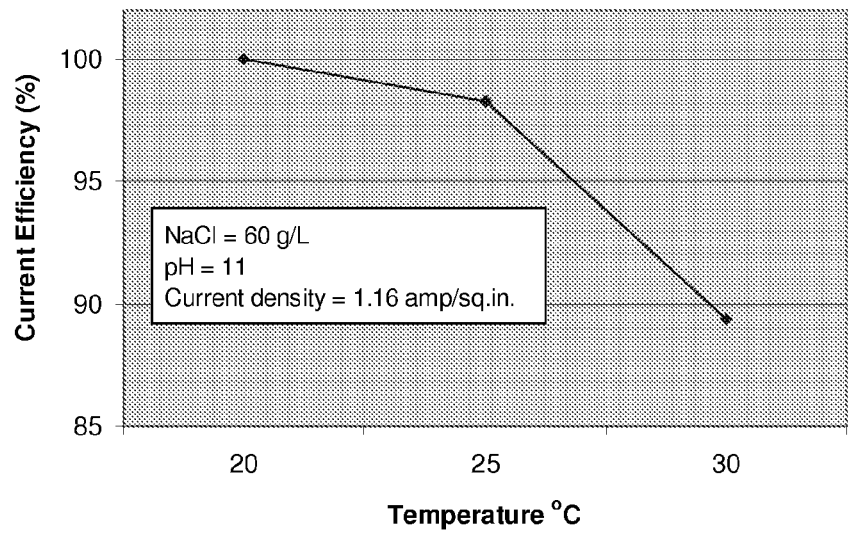
FIG. 9 shows a graph of current efficiency for the production of sodium hypochlorite as a function of temperature in an electrolytic cell as described in Example 7.

This test compares the performance of a sodium ion conductive ceramic membrane based cell with an undivided cell used for producing sodium hypochlorite. The comparison results are shown in FIGS. 7 and 8. The ceramic membrane based cell, FIG. 1, is more efficient in making sodium hypochlorite as compared to the undivided cell. In an undivided cell (bi-polar electrode cell, without a separator between the electrodes) part of the sodium hypochlorite produced by the cell is reduced back to chloride at the cathode since the electrodes in the cell are not separated from each other. The ceramic membrane based electrolytic cell is capable of producing sodium hypochlorite at a higher concentration than the undivided cell under similar operating conditions.

EXAMPLE 7

Comparison of the effect of temperature on the efficiency of sodium hypochlorite generation in an electrolytic cell containing a sodium ion conductive membrane.

These tests compare the effect of temperature on efficiency of sodium hypochlorite generation with ceramic membrane cell. The results are presented in FIG. 9. The results show that as the operating temperature of the cell increases the current efficiency of the process decreases since the stability of sodium hypochlorite decreases as a function of temperature. The optimum operating temperature for the electrolytic cell to produce sodium hypochlorite was found to be about 20° C. The electrolytic cell may be effectively operated at room temperature, and preferably less than about 30° C.

EXAMPLE 8

Effect of electrolytic cell operating current density on current efficiency in production of sodium hypochlorite.

Figure 10:
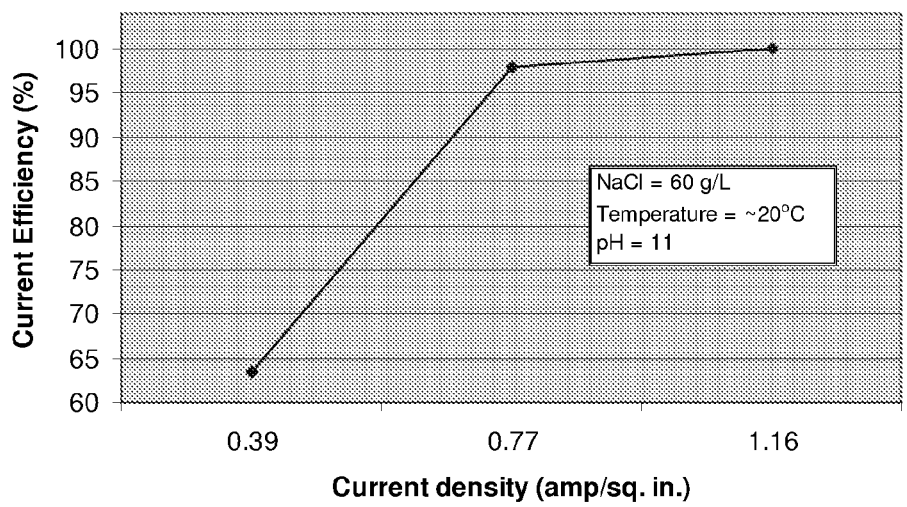
FIG. 10 shows a graph of current efficiency as a function of current density in an electrolytic cell as described in Example 8.

A test was conducted to measure the effect of cell operating current density on current efficiency in the process of producing sodium hypochlorite using an apparatus as shown in FIG. 1. The current efficiency of the ceramic membrane based cell as a function of current density is shown in FIG. 10. The current efficiency of the electrolytic cell increases as a function of operating current density. The current density is preferably in the range from about 0.03 to about 1.47 amps/sq. in (5 mA/cm$^2$ to about 150 mA/cm$^2$).

EXAMPLE 9

Effect of electrolytic cell anolyte pH on current efficiency in production of sodium hypochlorite.

Figure 11:
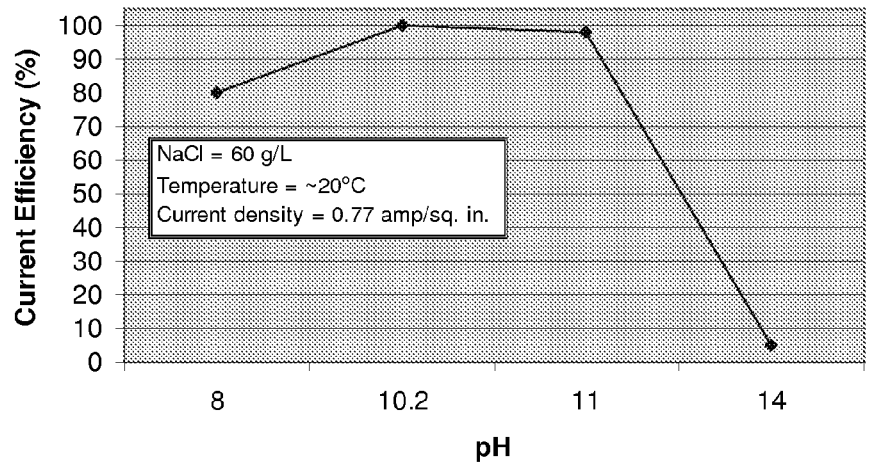
FIG. 11 shows a graph of the effect of pH on the current efficiency for the production of sodium hypochlorite in an electrolytic cell as described in Example 9.
Figure 12:
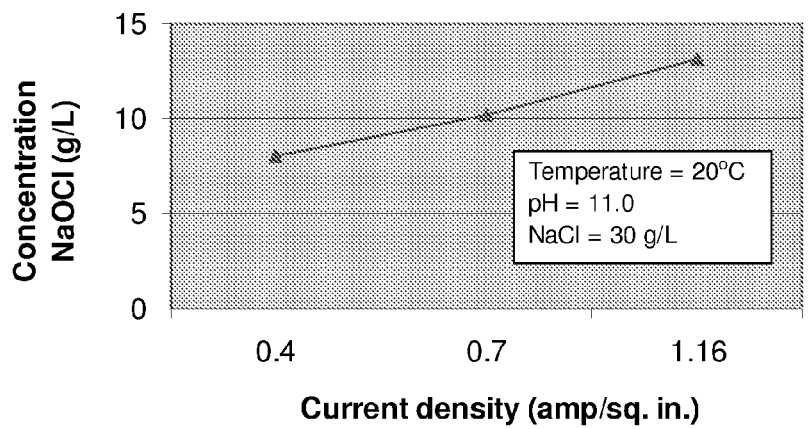
FIG. 12 shows a graph of the production of sodium hypochlorite as a function of current density in an electrolytic cell as described in Example 9.

A test was conducted to measure the effect of anolyte pH on current efficiency in the process of producing sodium hypochlorite using an apparatus as shown in FIG. 1. The results are shown in FIG. 11. The optimum pH range to operate the electrolytic cell was measured to be between 10 and 11. FIG. 12 shows a test performed at pH 11. This pH range for the anolyte can be maintained in the ceramic membrane cell by controlled addition of sodium hydroxide from the catholyte compartment of the electrolytic cell. It is not practical or possible, however, to control the pH in an undivided electrolytic cell, which allows mixing of anolyte and catholyte solutions within the cell, giving rise to a solution which normally ranges from 8 to 9 in pH.

EXAMPLE 10

Effect of high sodium chloride concentration on the process of producing sodium hypochlorite.

Figure 13:
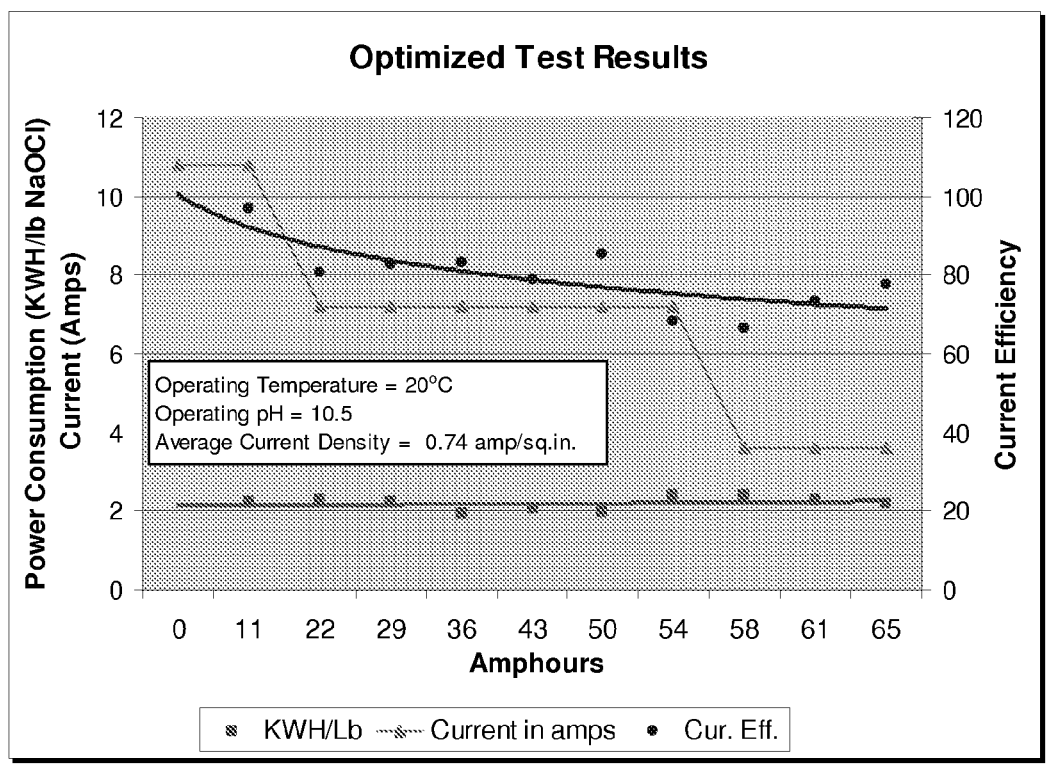
FIG. 13 shows a graph of the power consumption, current, and current efficiency as a function of Amp·Hours in the electrolytic cell as described in Example 10

This test was conducted to measure the performance of the process of producing sodium hypochlorite using an apparatus as shown in FIG. 1 at optimized temperature and pH conditions, and high salt concentration. The results are shown in FIG. 13. The starting sodium chloride concentration in this test was about 200 grams/liter, instead of the customary 30 grams/liter, which is the optimized salt concentration used with the undivided cell method to get maximum benefits from the process to make sodium hypochlorite. The electrolytic cell containing a sodium ion conductive ceramic membrane, unlike undivided cell operation, is flexible enough to accommodate salt concentration changes during its operation, both salt and current density parameters in this test were adjusted during the test to minimize both power and salt consumptions.

From the foregoing, it will be appreciated that the present invention provides an efficient process to produce sodium hypochlorite using an electrolytic cell with a sodium ion conductive ceramic membrane. Higher concentration of sodium hypochlorite may be produced according to processing within the scope of the present invention compared to current industrial processes. Processes within the scope of the present invention may be used to produce sodium hypochlorite from a variety of different input sodium chloride solutions, including impure salt solutions, such as seawater, brine solutions, or industrial salt solutions. The processes may be used with wide variation of sodium chloride solution concentrations. The sodium ion conductive ceramic membrane, combined with the ability to control pH in the anolyte compartment, greatly minimizes problems associated with electrode fouling and precipitation of unwanted cations. Separating the catholyte compartment from the anolyte compartment enables hydrogen gas to be collected and used to produce energy and to offset the process's energy requirements. The electrolytic process within the scope of the present invention may provide on-site generation of sodium hypochlorite. Finally, the processes within the scope of the present invention use a closed system electrolytic cell with no waste streams.

While specific embodiments of the present invention have been illustrated and described, numerous modifications come to mind without significantly departing from the spirit of the invention, and the scope of protection is only limited by the scope of the accompanying claims.

The invention claimed is:

1. A method for producing a sodium hypochlorite solution, comprising:
    (a) obtaining an electrolytic cell comprising a sodium ion conductive ceramic membrane configured to selectively transport sodium ions, the ceramic membrane separating an anolyte compartment configured with an anode and a catholyte compartment configured with a cathode;
    (b) providing an impure sodium chloride solution containing calcium, magnesium, or other precipitable cations in the anolyte compartment of the cell;
    (c) providing water and sodium ions in the catholyte compartment of the electrolytic cell;
    (d) applying an electric current to the electrolytic cell thereby:
        i. oxidizing chlorine anions in the anolyte compartment according to the following reaction: $2Cl^- \rightarrow Cl_2 + 2e^-$ and forming hypochlorous acid according to the following reaction: $Cl_2 + H_2O \rightarrow HOCl + HCl$;
        ii. causing sodium ions to pass through the sodium ion conductive ceramic membrane from the anolyte compartment to the catholyte compartment; and
        iii. decomposing water in the presence of sodium ions in the catholyte compartment according to the following reaction: $Na^+ + H_2O + e^- \rightarrow NaOH + \frac{1}{2}H_2$;
    (e) withdrawing and transporting sodium hydroxide solution from the catholyte compartment to the anolyte compartment in a controlled fashion to produce sodium hypochlorite in the anolyte compartment according to the following reaction: $HOCl + HCl + 2NaOH \rightarrow NaOCl + NaCl + 2H_2O$;
    (f) maintaining a pH of the impure sodium chloride solution within the anolyte compartment at a pH less than 8, wherein the pH of the impure sodium chloride solution within the anolyte compartment is also maintained at about 6 or greater; and
    (g) removing a solution comprising sodium hypochlorite from the anolyte compartment.

2. The method according to claim 1, wherein the impure sodium chloride solution is intermittently fed into the anolyte compartment and the sodium hypochlorite solution is intermittently removed from the anolyte compartment.

3. The method according to claim 2, wherein water is intermittently fed into the catholyte compartment and the sodium hydroxide solution is intermittently withdrawn from the catholyte compartment and added to the anolyte compartment to produce sodium hypochlorite.

4. The method according to claim 1, wherein the impure sodium chloride solution is continuously fed into the anolyte compartment and the sodium hypochlorite solution is or continuously removed from the anolyte compartment.

5. The method according to claim 4, wherein water is continuously fed into the catholyte compartment and the sodium hydroxide solution is continuously withdrawn from the catholyte compartment and added to the anolyte compartment to produce sodium hypochlorite.

6. The method according to claim 1, wherein the impure sodium chloride solution is seawater or brine.

7. The method according to claim 1, wherein the impure sodium chloride solution is prepared by dissolving NaCl in unpurified water.

8. The method according to claim 1, wherein the concentration of sodium chloride in the impure sodium chloride solution is below its saturation limit in water.

9. The method according to claim 1, wherein the concentration of sodium chloride in the impure sodium chloride solution is between about 0.1% by weight and about 26% by weight of the solution.

10. The method according to claim 1, wherein the concentration of sodium chloride in the impure sodium chloride solution is between about 2 grams/liter and about 200 grams/liter.

11. The method according to claim 1, wherein the water and sodium ions provided to the catholyte compartment comprise an unsaturated sodium hydroxide solution.

12. The method according to claim 1, wherein the water and sodium ions provided to the catholyte compartment comprise a sodium hydroxide solution wherein the concentration of sodium hydroxide is less than or equal to 50% by weight of the solution.

13. The method of claim 1, wherein the solution comprising sodium hypochlorite removed from anolyte compartment has a concentration of sodium hypochlorite between about 0.1% and about 25% by weight.

14. The method of claim 1, wherein the solution comprising sodium hypochlorite removed from anolyte compartment has a concentration of sodium hypochlorite between about 2% and about 20% by weight.

15. The method of claim 1, wherein the solution comprising sodium hypochlorite removed from anolyte compartment has between about 0.1 g/liter of sodium hypochlorite and about 20 g/liter sodium hypochlorite.

16. The method according to claim 1, further comprising the step of maintaining an electrolytic cell operating temperature less than 40° C.

17. The method according to claim 1, wherein the electric current is applied to the electrolytic cell at a current density greater than 0.1 amps/sq. inch.

18. The method according to claim 1, wherein the electric current is applied to the electrolytic cell at a current density between about 0.01 and 1.16 amp/sq. inch.

19. The method according to claim 1, wherein the sodium ion conductive ceramic membrane comprises a NaSICON material.

20. The method according to claim 19, wherein the NaSICON material has the formula $Na_{1+x}Zr_2Si_xP_{3-x}O_{12}$ where $0 \leq x \leq 3$.

21. The method according to claim 19, wherein the NaSICON material has the formula $Na_5RESi_4O_{12}$ where RE is Y, Nd, Dy, or Sm, or any mixture thereof.

22. The method according to claim 19, wherein the NaSICON material comprises a non-stoichiometric sodium-deficient NaSICON material having the formula $(Na_5RESi_4O_{12})_{1-\delta}(RE_2O_3 \cdot 2SiO_2)_\delta$, where RE is Nd, Dy, or Sm, or any mixture thereof and where $\delta$ is the measure of deviation from stoichiometry.

23. The method according to claim 1, wherein the sodium ion conductive ceramic membrane comprises a monolithic flat plate, a monolithic tube, a monolithic honeycomb, or supported structures of the foregoing.

24. The method according to claim 1, wherein the sodium ion conductive ceramic membrane comprises a layered sodium ion conducting ceramic-polymer composite membrane, comprising sodium ion selective polymers layered on sodium ion conducting ceramic solid electrolyte materials.

25. The method according to claim 1, wherein the sodium ion conductive ceramic membrane comprises a plurality of co-joined layers of two or more different sodium-ion conducting ceramic materials.

26. The method according to claim 1, wherein the sodium ion conductive ceramic membrane has a flat plate geometry in the form of thin sheets supported on porous ceramic substrates or thicker plates.

27. The method according to claim 1, wherein the sodium ion conductive ceramic membrane has a tubular geometry in the form of thin sheets supported on porous ceramic substrates or thicker tubes.

28. The method according to claim 1, further comprising the step of collecting and removing hydrogen gas from the catholyte compartment.

29. The method according to claim 28, wherein the hydrogen gas provide fuel to an alternative energy generating process.

30. The method according to claim 1, wherein the solution comprising sodium hypochlorite is made for on-site use applications.

31. An electrolytic cell for producing sodium hypochlorite (NaOCl) comprising:
   an anolyte compartment comprising an electrochemically active anode having a source of impure sodium chloride solution containing calcium, magnesium, or other precipitable cations in which chloride anions are oxidized according to the following reaction: $2Cl^- \rightarrow Cl_2 + 2e^-$, and the chlorine reacts with water according to the following reaction: $Cl_2 + H_2O \rightarrow HOCl + HCl$;
   a catholyte compartment comprising an electrochemically active cathode separated from the anolyte compartment by a sodium ion conductive ceramic membrane configured to selectively transport sodium ions ($Na^+$) into the catholyte compartment, wherein the catholyte compartment has a source of water and $Na^+$ ions, in which the water is decomposed according to the following reaction: $Na^+ + H_2O + e^- \rightarrow NaOH + \frac{1}{2}H_2$;
   a vent for collecting and removing $H_2$ from the catholyte compartment;
   a fluid path for removing a portion of the NaOH from the catholyte compartment and introducing the NaOH into the anolyte compartment to enable the following reaction: $HOCl + HCl + 2NaOH \rightarrow NaOCl + NaCl + H_2O$;
   means for maintaining a pH of the impure sodium chloride solution within the anolyte compartment at a pH less than 8, wherein the pH of the impure sodium chloride solution within the anolyte compartment is also maintained at about 6 or greater; and
   a fluid path for removing sodium hypochlorite produced in the anolyte compartment.

32. The electrolytic cell according to claim 31, wherein the sodium ion conductive ceramic membrane comprises a NaSICON material.

33. The electrolytic cell according to claim 32, wherein the NaSICON material has the formula $Na_{1+x}Zr_2Si_xP_{3-x}O_{12}$ where $0 \leq x \leq 3$.

34. The electrolytic cell according to claim 32, wherein the NaSICON material has the formula $Na_5RESi_4O_{12}$ where RE is Y, Nd, Dy, or Sm, or any mixture thereof.

35. The electrolytic cell according to claim 32, wherein the NaSICON material comprises a non-stoichiometric sodium-deficient NaSICON material having the formula $(Na_5RESi_4O_{12})_{1-\delta}(RE_2O_3 \cdot 2SiO_2)_\delta$, where RE is Nd, Dy, or Sm, or any mixture thereof and where $\delta$ is the measure of deviation from stoichiometry.

36. The electrolytic cell according to claim 31, wherein the sodium ion conductive ceramic membrane comprises a monolithic flat plate, a monolithic tube, a monolithic honeycomb, or supported structures of the foregoing.

37. The electrolytic cell according to claim 31, wherein the sodium ion conductive ceramic membrane comprises a layered sodium ion conducting ceramic-polymer composite membrane, comprising sodium ion selective polymers layered on sodium ion conducting ceramic solid electrolyte materials.

38. The electrolytic cell according to claim 31, wherein the sodium ion conductive ceramic membrane comprises a plurality of co-joined layers of two or more different sodium-ion conducting ceramic materials.

39. The electrolytic cell according to claim 31, wherein the sodium ion conductive ceramic membrane has a flat plate geometry in the form of thin sheets supported on porous ceramic substrates or thicker plates.

40. The electrolytic cell according to claim 31, wherein the sodium ion conductive ceramic membrane has a tubular geometry in the form of thin sheets supported on porous ceramic substrates or thicker tubes.

41. A method for producing a sodium hypochlorite solution, comprising:
(a) obtaining an electrolytic cell comprising a sodium ion conductive ceramic membrane configured to selectively transport sodium ions, the ceramic membrane separating an anolyte compartment configured with an anode and a catholyte compartment configured with a cathode;
(b) providing an impure sodium chloride solution containing calcium, magnesium, or other precipitable cations in the anolyte compartment of the cell;
(c) providing water and sodium ions in the catholyte compartment of the electrolytic cell;
(d) applying an electric current to the electrolytic cell thereby:
   i. oxidizing chlorine anions in the anolyte compartment according to the following reaction: $2Cl^- \rightarrow Cl_2 + 2e^-$ and forming hypochlorous acid according to the following reaction: $Cl_2 + H_2O \rightarrow HOCl + HCl$;
   ii. causing sodium ions to pass through the sodium ion conductive ceramic membrane from the anolyte compartment to the catholyte compartment; and
   iii. decomposing water in the presence of sodium ions in the catholyte compartment according to the following reaction: $Na^+ + H_2O + e^- \rightarrow NaOH + \frac{1}{2}H^2$;
(e) withdrawing and transporting sodium hydroxide solution from the catholyte compartment to the anolyte compartment in a controlled fashion to produce sodium hypochlorite in the anolyte compartment according to the following reaction: $HOCl + HCl + 2NaOH \rightarrow NaOCl + NaCl + 2H_2O$;
(f) maintaining a pH of the impure sodium chloride solution within the anolyte compartment at a pH less than a pH at which calcium ions and magnesium ions precipitate, wherein the pH of the impure sodium chloride solution within the anolyte compartment is also maintained at about 6 or greater; and
(g) removing a solution comprising sodium hypochlorite from the anolyte compartment.

* * * * *